US007123882B1

(12) United States Patent
Frazier

(10) Patent No.: US 7,123,882 B1
(45) Date of Patent: Oct. 17, 2006

(54) DIGITAL PHASED ARRAY ARCHITECTURE AND ASSOCIATED METHOD

(75) Inventor: Gary A. Frazier, Garland, TX (US)

(73) Assignee: Raytheon Company, Dallas, TX (US)

( * ) Notice: Subject to any disclaimer, the term of this patent is extended or adjusted under 35 U.S.C. 154(b) by 0 days.

(21) Appl. No.: 09/519,069

(22) Filed: Mar. 3, 2000

(51) Int. Cl.
*H04B 1/38* (2006.01)

(52) U.S. Cl. ........................................ 455/73; 455/63.4

(58) Field of Classification Search ................ 455/137, 455/562.1, 73, 13.3, 19, 25, 63.4, 575.7, 455/121, 129, 526, 131; 342/464, 465, 368, 342/172, 375; 343/824, 754
See application file for complete search history.

(56) References Cited

U.S. PATENT DOCUMENTS

| | | | | |
|---|---|---|---|---|
| 3,611,401 | A | 10/1971 | Connolly | 343/854 |
| 4,688,045 | A | 8/1987 | Knudsen | 342/377 |
| 4,743,914 | A * | 5/1988 | Schuss et al. | 343/754 |
| 4,749,995 | A | 6/1988 | Hopwood et al. | 342/371 |
| 5,081,460 | A | 1/1992 | Liu | 342/169 |
| 5,084,708 | A | 1/1992 | Champeau et al. | 342/377 |
| 5,130,717 | A | 7/1992 | Ewen et al. | 342/375 |
| 5,231,405 | A | 7/1993 | Riza | 342/375 |
| 5,365,239 | A | 11/1994 | Stilwell, Jr. | 342/368 |
| 5,414,433 | A | 5/1995 | Chang | 342/375 |
| 5,650,788 | A | 7/1997 | Jha | 343/700 |
| 5,764,187 | A | 6/1998 | Rudish et al. | 342/372 |
| 5,907,517 | A * | 5/1999 | Komarek et al. | 365/210 |
| 5,943,010 | A | 8/1999 | Rudish et al. | 342/372 |
| 5,977,913 | A * | 11/1999 | Christ | 342/465 |
| 5,990,830 | A | 11/1999 | Vail et al. | 342/368 |
| 6,184,832 | B1 | 2/2001 | Geyh et al. | 343/700 |
| 6,185,107 | B1 | 2/2001 | Wen | 361/803 |
| 6,351,247 | B1 * | 2/2002 | Linstrom et al. | 343/797 |
| 6,693,590 | B1 * | 2/2004 | Toplicar et al. | 342/383 |
| 2002/0013133 | A1 * | 1/2002 | Lam | 455/137 |

OTHER PUBLICATIONS

R. Tang, "Survey of Time-Delay Beam Steering Techniques," Phased-Array Antenna Symposium, Polytechnic Institute of Brooklyn, Long Island, NY, pp. 254-260 (1972).
International Search Report, Oct. 15, 2001.

* cited by examiner

*Primary Examiner*—Joseph Feild
*Assistant Examiner*—Huy D Nguyen
(74) *Attorney, Agent, or Firm*—O'Keefe, Egan & Peterman, LLP

(57) ABSTRACT

Digital phased array architecture and associated method are disclosed that eliminate the necessity of utilizing analog phase shifters in the receive and transmit signal paths. Desired delays are instead generated by adjusting the timing of sampling signals sent to analog-to-digital converters (ADCs) and digital-to-analog converters (DACs) in the receive and transmit signal paths.

59 Claims, 4 Drawing Sheets

DIGITAL PHASED ARRAY ARCHITECTURE AND ASSOCIATED METHOD

TECHNICAL FIELD OF THE INVENTION

The present invention relates to digital phased arrays that send and receive electromagnetic energy. More particularly, the present invention relates to digitally programmable phased arrays that send and receive radio-frequency (RF) signals.

BACKGROUND

Phased arrays have included multiple antennas coupled with analog phase shifters that allow electromagnetic energy, such as radio frequency (RF) signals, to be sent and received along desired wave-front directions. The effective directivity pattern, or beam shape, of an array of antenna elements can be changed by altering the relative phase of the coherent RF energy arriving at, or emitted from, each element. For example, if all of the elements in a plane of equally spaced identical elements are fed by the same RF signal, the intensity of the radiated electromagnetic energy will be greatest along a line perpendicular to this plane. Alternatively, if the elements are each fed with a progressively phase-shifted RF signal, the direction of maximum radiated intensity will be at some angle away from the normal, or broadside, direction. An antenna system wherein the beam direction of an array of elements can be steered using electronic shifting of the relative element phase is often called an electronically steered antenna (ESA).

Many different kinds of phase shifters are available for controlling the relative phase of RF energy feeding antenna element arrays. These can include ferrites, diode-switched delay lines, and micro-electromechanical switches (MEMS). All of these technologies can be arranged to provide a digitally programmable phase delay (or shift) to each element by using a digitally weighted control signal to adjust the phase properties of the element. However, since these phase shifter circuits must be placed in the analog RF signal path that is between the energy source (e.g., the transmitter) and the antenna elements, it is always the case that some RF energy is lost to dissipation and radiation within the phase shifter. A typical phase shifter, for example, might introduce 0.5 dB of insertion loss per bit of phase shift control. A 5-bit phase shifter, typical of many radar systems, would thereby incur a minimum 2.5 dB insertion loss using such a device. Insertion losses require higher transmitter powers to achieve a given radiated power from the antenna elements.

When used in the receive path of a transmit/receive phased array system, phase shifter loss degrades the sensitivity and noise figure of the phased array receiver. This in turn requires high amplifier gain and results in a reduction of useable bandwidth. Moreover, many phase shifters must trade insertion loss for useable bandwidth. For example, a phase shifter useful over the X-band (8–12 GHz) might be excessively lossy if it must in addition be made to operate from 2–30 GHz. The phase shifting properties of a low-loss phase shifter will almost always be frequency dependent so that wide bandwidth signals, such as radar pulses, may undergo phase distortion as they pass through a phase shifter.

In short, although programmable phase shifters are useful for electronically steering phased array antennas, they are problematic when they must either satisfy the requirement of low loss or wide-bandwidth operation.

Prior attempts to minimize the negative impact of phase shifters on phased array performance involve the development of lower loss and broader bandwidth phase shifter technology. One such technology focuses on using micro-electromechanical switches (MEMS) for the phase shifter circuitry. MEMS devices utilize electrically controlled mechanical switches that require less power than other types of phase shifters. Because it is cumbersome to use MEMS phase shifters to control the entire phase shift in large arrays, secondary phase shifters are usually used to phase-combine multiple sections of the array until a single signal channel is obtained. This combining technique thereby reduces the range of phase shift required by the MEMS phase shifter devices. Because the signal level and signal-to-noise ratio can be degraded by the series combination of many layers of analog phase shifters, this combining technique requires the additional use of many broadband amplifiers to re-generate the signal as it progresses through the combined network.

Recently, the phased array industry has also proposed to construct phased array receivers and transmitters wherein analog-to-digital and/or digital-to-analog circuitry is associated with each antenna element. For example, in the receive mode, a separate analog-to-digital converter (ADC) is used to digitize the RF signal collected by each separate element, and these many digital data streams are then electronically combined to provide a single signal characteristic of the many signals collected by the entire antenna. In transmit mode, a digital-to-analog converter (DAC) is placed at each antenna element such that a digital data stream can be converted by this DAC into an analog RF signal. The generated RF signal from each DAC is then amplified and fed to its associated antenna element. Due to the all-digital interface between the antenna element and the rest of the phased array system, this phased array concept may be considered a "digital" antenna.

FIG. 1 (Prior Art) depicts an example embodiment for such a digital phased array circuitry. An antenna 140 is connected to a switch 136 that in turn connects either the receive path signal 134 or the transmit path signal 132 to the output line 138. Looking to the receive path, the receive path signal 134 connects to a low noise amplifier (LNA) 114, then to a phase shifter 102, and ultimately to an analog-to-digital converter (ADC) 108. ADC 108 provides an M-bit receive data signal 128 that may used by further beam-forming circuitry. Looking to the transmit path, a digital-to-analog converter (DAC) 112 receives an M-bit transmit data signal 130 and provides an analog signal to a phase shifter 104. The output of the phase shifter 104 connects to a power amplifier (PA) 116 and then to the transmit path signal 132. The ADC 108 and the DAC 112 have sampling rates controlled by clock signals (SCLK) 124 and 126 provided by clock circuitry 110.

The phase shifters 102 and 104 add a programmable delay to their relative analog input signals. Thus, phase shifter 102 delays signal 142 with respect to signal 140 by a programmed amount, and phase shifter 104 delays signal 144 with respect to signal 146 by a programmed amount. The amount of the delay is determined by the control register 106. Based upon the delay value 118 provided to the control register 106, the control register 106 provides phase shifters 102 and 104 with X-bit digital control words 120 and 122, respectively. These control words 120 and 122 determine the amount of the delay added to the analog signals passing through the phase shifters 102 and 104.

Although the antenna embodiment of FIG. 1 (prior art) may provide a digital interface, it still requires analog phase shifters between the antenna element and the ADC or DAC to provide the fine phase shifting function needed to fine-steer the overall antenna pattern. In other words, the inclusion of an ADC or DAC near the antenna element does not mitigate the negative impact of phase shifters on array performance.

SUMMARY OF THE INVENTION

In accordance with the present invention, digital phased array architecture and associated method are disclosed that eliminate the necessity of utilizing analog phase shifters in the receive and transmit signal paths. Desired delays are instead generated by adjusting the timing of the sampling signals sent to analog-to-digital converters (ADCs) and digital-to-analog converters (DACs) in the receive and transmit signal paths.

In one embodiment, the present invention is a digital phased array for receiving electromagnetic energy, including a plurality of antenna elements capable of receiving electromagnetic energy and a receive module coupled to each of the plurality of antenna elements. Each receive module may include an analog to digital converter controlled by a clock signal generated by clock circuitry coupled to a delay circuit, and each delay circuit delays a base clock signal from the clock circuitry by a desired amount so that a receive direction of the plurality of antenna elements may be electronically controlled. In addition, the plurality of antenna elements may be grouped into sets of antenna elements, and each antenna element within the same set may have the same amount of programmed delay.

In another embodiment, the present invention is a digital phased array receive-path module, including an analog to digital converter having an analog input signal representative of received electromagnetic energy, clock circuitry having a clock output signal, and time delay circuitry coupled to the clock output signal to provide a relative delay to the clock output signal, such that the delayed clock output signal is coupled to the analog to digital converter to control a sampling rate for the analog to digital converter. In addition, synchronization circuitry may be coupled to the analog to digital converter to receive and then output data from the analog to digital converter at an output clock rate. Furthermore, the output clock rate for the synchronization circuitry may match the clock signal controlling the analog to digital converter.

In a further embodiment, the present invention is a digital phased array for transmitting electromagnetic energy, including a plurality of antenna elements capable of transmitting electromagnetic energy, and a transmit module coupled to each of the plurality of antenna elements. Each transmit module may include a digital-to-analog converter controlled by a clock signal generated by clock circuitry coupled to a delay circuit, and each delay circuit may delay a base clock signal from the clock circuitry by a desired amount so that a transmit direction of the plurality of antenna elements may be electronically controlled. In addition, the plurality of antenna elements may be grouped into sets of antenna elements, and wherein each antenna element within the same set has the same amount of programmed delay.

In a still further embodiment, the present invention is a digital phased array transmit-path module, including a digital to analog converter having a digital input signal representative of electromagnetic energy to be transmitted, clock circuitry having a clock output signal, and programmable time delay circuitry coupled to the clock output signal to provide a relative delay to the clock output signal, such that the delayed clock output signal being coupled to the digital to analog converter to control a operational rate for the digital to analog converter. In addition, synchronization circuitry may be coupled to the digital to analog converter to receive and then output data to the digital to analog converter at an output clock rate. Still further, the output clock rate for the synchronization circuitry may match the clock signal controlling the digital to analog converter.

In another embodiment, the present invention is a digital phased array for receiving and transmitting electromagnetic energy, including, a plurality of antenna elements capable of receiving and transmitting electromagnetic energy, a receive module coupled to each of the plurality of antenna elements, and a transmit module coupled to each of the plurality of antenna elements. Each receive module may include an analog to digital converter controlled by a clock signal generated by clock circuitry coupled to a programmable delay circuit, wherein each programmable delay circuit delays a base clock signal from the clock circuitry by a desired amount so that a receive direction of the plurality of antenna elements may be electronically controlled. Each transmit module may include a digital to analog converter controlled by a clock signal generated by clock circuitry coupled to a programmable delay circuit, wherein each programmable delay circuit delays a base clock signal from the clock circuitry by a desired amount so that a transmit direction of the plurality of antenna elements may be electronically controlled.

Still further, the present invention is, a digital phased array transmit/receive module, including an analog to digital converter having an analog input signal representative of received electromagnetic energy, a digital to analog converter having a digital input signal representative of electromagnetic energy to be transmitted, clock circuitry having a clock output signal; and programmable time delay circuitry coupled to the clock output signal to provide a relative delay to the clock output signal, such that the delayed clock output signal is coupled to the analog to digital converter to control a sampling rate for the analog to digital converter and being coupled to the digital to analog converter to control a operational rate for the digital to analog converter. More particularly, the programmable delay circuitry may include a first time delay circuit having a clock output for the analog to digital converter and a second time delay circuit having a clock output for the digital to analog converter. Also, the programmable delay circuitry may include a single time delay circuit having a single clock output for both the analog to digital converter and the digital to analog converter.

In yet another embodiment, the present invention is a method for receiving electromagnetic energy, including receiving analog electromagnetic energy with a plurality of antenna elements, converting analog information from the plurality of antenna elements to digital information utilizing an analog to digital converters associated with the antenna elements, and controlling each analog to digital converter with a clock signal generated by clock circuitry coupled to a delay circuit so that each delay circuit delays a base clock signal from the clock circuitry by a desired amount so that a receive direction of the plurality of antenna elements may be electronically controlled.

In another embodiment, the present invention is a method for transmitting electromagnetic energy, including converting digital information to analog information utilizing a plurality of digital to analog converters associated with a plurality of antenna elements, controlling each digital to analog converter with a clock signal generated by clock circuitry coupled to a delay circuit so that each delay circuit delays a base clock signal from the clock circuitry by a desired amount so that a transmit direction of the plurality of antenna elements may be electronically controlled, and transmitting electromagnetic energy in the transmit direction.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 2:
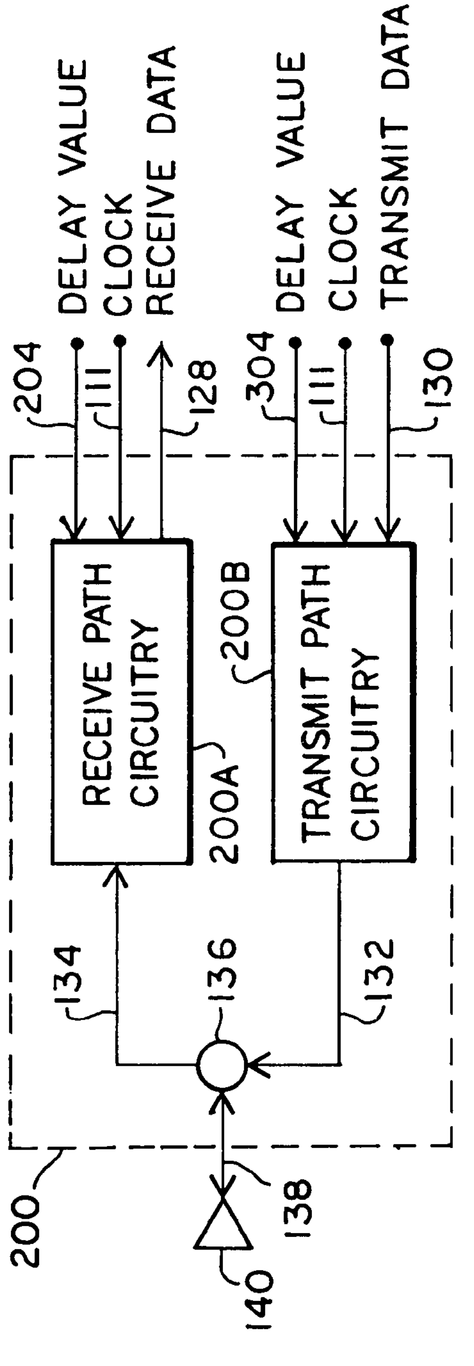
FIG. 2 is a block diagram of a digital phased array module having time delay control of the sampling rate for an analog-to-digital converter (ADC) and a digital-to-analog converter (DAC), according to the present invention.

Referring to FIG. 2, a block diagram is shown for a digital phased array module having time delay control of the sampling rates for an analog-to-digital converter (ADC) a digital-to-analog converter (DAC), according to the present invention. The digital phased array module 200 includes a switch 136, receive path circuitry 200A, and transmit path circuitry 200B. The switch 136 is connected to an external antenna 140. Receive path circuitry 200A is connected to the switch 136 through receive signal path 134. Receive path circuitry 200A also receives a clock signal 111 and a delay value 204 that controls the sampling rate for ADC circuitry with the receive path circuitry 200A. Transmit path circuitry 200B is connected to the switch 136 through receive signal path 132. Transmit path circuitry 200B also receives a clock signal 111 and a delay value 304 that controls the sampling rate for DAC circuitry with the receive path circuitry 200B.

Figure 3A:
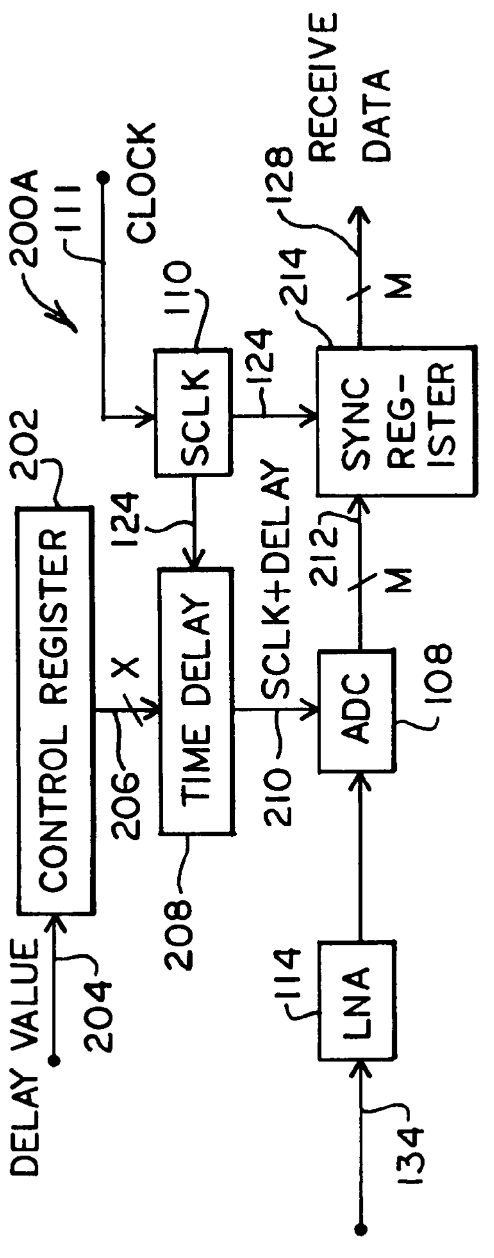
FIG. 3A is a block diagram of the receive path of a digital phased array module having time delay control of the sampling rates for an analog-to-digital converter (ADC), according to the present invention.

FIG. 3A is an embodiment for the receive path circuitry 200A of a digital phased array module 200, according to the present invention. The receive path signal 134 connects to a low noise amplifier (LNA) 114 and then to an analog-to-digital converter (ADC) 108. The ADC 108 samples the receive path signal at a rate determined by clock signal 210 (SCLK+DELAY). Clock signal 210 (SCLK+DELAY) is determined by the clock signal (SCLK) 124 provided by clock circuitry 110 plus a programmable time delay added by time delay circuitry 208. Clock circuitry 110 also receives external clock signal 111. The delay circuitry 208 is in turn controlled by an X-bit digital word 206 from a control register 202. The control register 202 may be loaded with a desired delay value 204.

The output of the ADC 108 is an M-bit digital value 212, which is provided to a register 214. Register 214 may be utilized to synchronize the digital data coming from various modules 200 that may be connected to multiple different antennas (see FIG. 5). The synchronization register 214 is controlled by the clock signal 124 (SCLK) from the clock circuitry 110. The digital receive data 128 coming from the module 200 will be, therefore, time aligned with digital receive data coming from other modules 200.

Figure 3B:
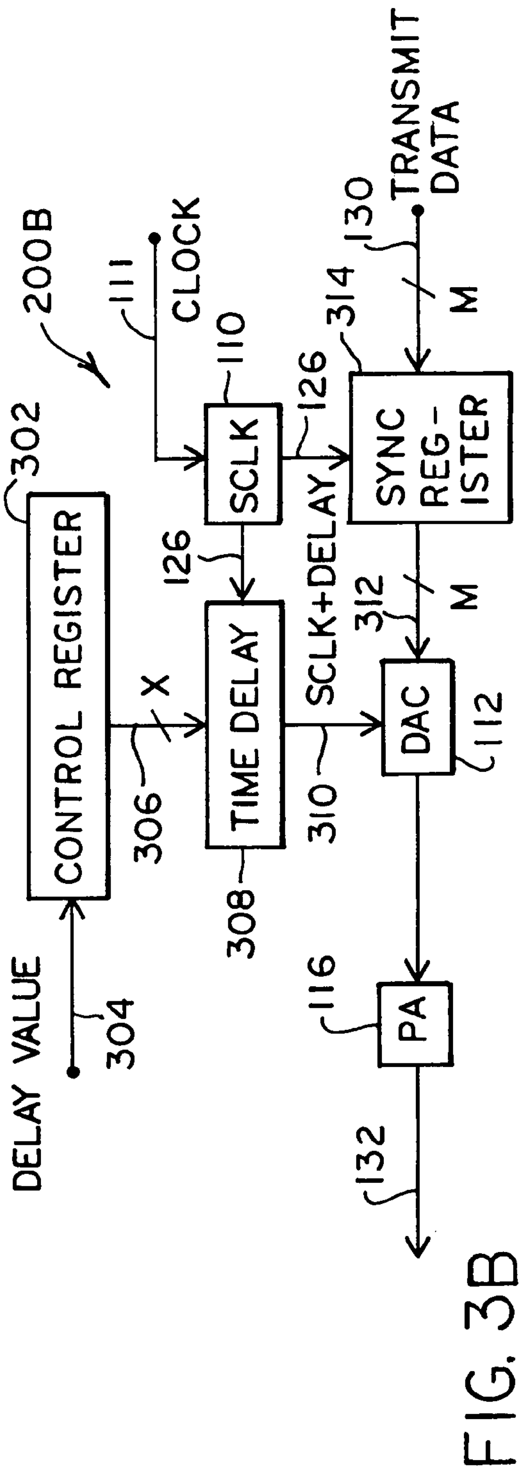
FIG. 3B is a block diagram of the transmit path of a digital phased array module having time delay control of the sampling rate for a digital-to-analog converter (DAC), according to the present invention.

FIG. 3B depicts an embodiment for the transmit path circuitry 200B for a digital phased array module 200, according to the present invention. The transmit path signal 132 is connected to a digital-to-analog converter (DAC) 112 through a power amplifier (PA) 116. The DAC 112 provides a changing analog signal at a rate determined by clock signal 310 (SCLK+DELAY). Clock signal 310 (SCLK+DELAY) is determined by the clock signal (SCLK) 126 provided by clock circuitry 110 plus a programmable time delay added by time delay circuitry 308. Clock circuitry 110 also receives external clock signal 111. The delay circuitry 308 is in turn controlled by an X-bit digital word 306 from a control register 302. The control register 302 may be loaded with a desired delay value 304.

The input of the DAC 112 is an M-bit digital value 312, which is provided by a register 314. Register 314 receives the M-bit digital transmit data 130 and is controlled by the clock signal 126 (SCLK) from the clock circuitry 110. The register 314 is utilized to synchronize the transmit signals to each module 200. Thus, the digital value 312 going to the DAC 112 in each module 200 will be time aligned. The register 314 tends to maintain a stable value for the transmitted data during the sampling time of DAC 112, thereby helping to reduce noise and errors that could be introduced if DAC 112 were connected directly to the global data destruction network.

Figure 1:
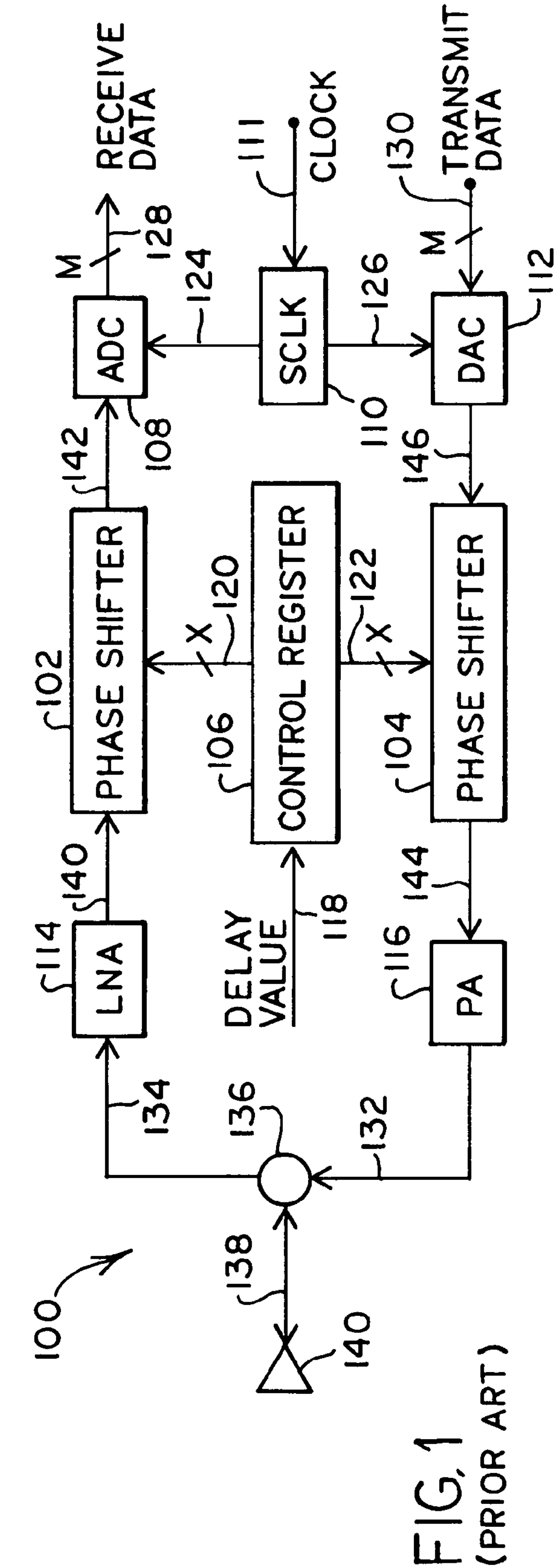
FIG. 1 (PRIOR ART)
FIG. 1 (Prior Art) is a block diagram of a previously proposed digital phased array module that includes an analog-to-digital converter (ADC) and a digital-to-analog converter (DAC) located near the antenna and phase shifter elements.

As compared to FIG. 1 (Prior Art), therefore, a phase shifter is not placed in the analog signal path; rather, delay circuitry is placed in the path of the clock signals used to control the ADC or DAC circuitry. This time delay circuitry is used to provide a programmable delay that controls the arrival of the clock signal to the ADC or DAC. In this way, for example, the antenna element signals are sampled (or generated) at a time that is delayed from the arrival of the master system clock to the module. Through delay adjustments to the clock signals, up to 360 degrees of relative phase shift of the clock signal, is allowed at whatever phase precision desired.

The time delay circuitry 208 and 308 may be implemented with any desired circuitry capable of introducing the desired timing delay to the sampling clock signal. For example, delay circuitry may be implemented using digitally programmable micro-electromechanical switch (MEMS) phase shifters, digitally programmable p-i-n diode phase shifters, and digitally programmable field effect transistor (FET) switching devices.

Looking again to the receive path circuitry 200A, because the ADC clock determines when the antenna signal is digitized, this delay provides exactly the same electronic effect as delaying the arrival of the element signal to the ADC using a phase shifter. In addition, because the ADC will normally operate using a fixed clock frequency, the clock delay circuit need only be designed to operate at this single frequency. Loss in this delay element is not critical because the amplitude of the clock signal can be easily restored using simple digital circuitry. The result is a much less complicated delay circuit and one that does not need to meet stringent bandwidth or loss requirements.

Looking again to the transmit path circuitry 200B, because the DAC clock determines when the analog signal fed to the antenna element changes, this clock delay provides exactly the same electronic effect as the traditional analog phase shifter. However, because the DAC will normally operate using a fixed clock frequency, the clock delay circuit need only be designed to operate at this single frequency. Loss in this delay element is not critical because the amplitude of the clock signal can be easily restored using simple digital circuitry. The result is a much less complicated delay circuit and one that does not need to meet stringent bandwidth or loss requirements.

Further, the digital antenna architecture of the present invention has the additional advantage of providing a true time delay, rather than a phase shift, for the signals received and transmitted by the antenna elements. There is no dependence in this approach on the antenna size or bandwidth. Unlike many current systems that mix fine phase shift with coarse true time delay, the entire digital antenna according to the present invention may operate according to true time delay at all frequencies, thereby enabling the construction of phased arrays of arbitrary size and arbitrary instantaneous bandwidth.

It is noted that architecture modifications could be made as desired to the receive path circuitry 200A and the transmit path circuitry 200B and still utilize ADC and DAC sampling time control according to the present invention.

Figure 3C:
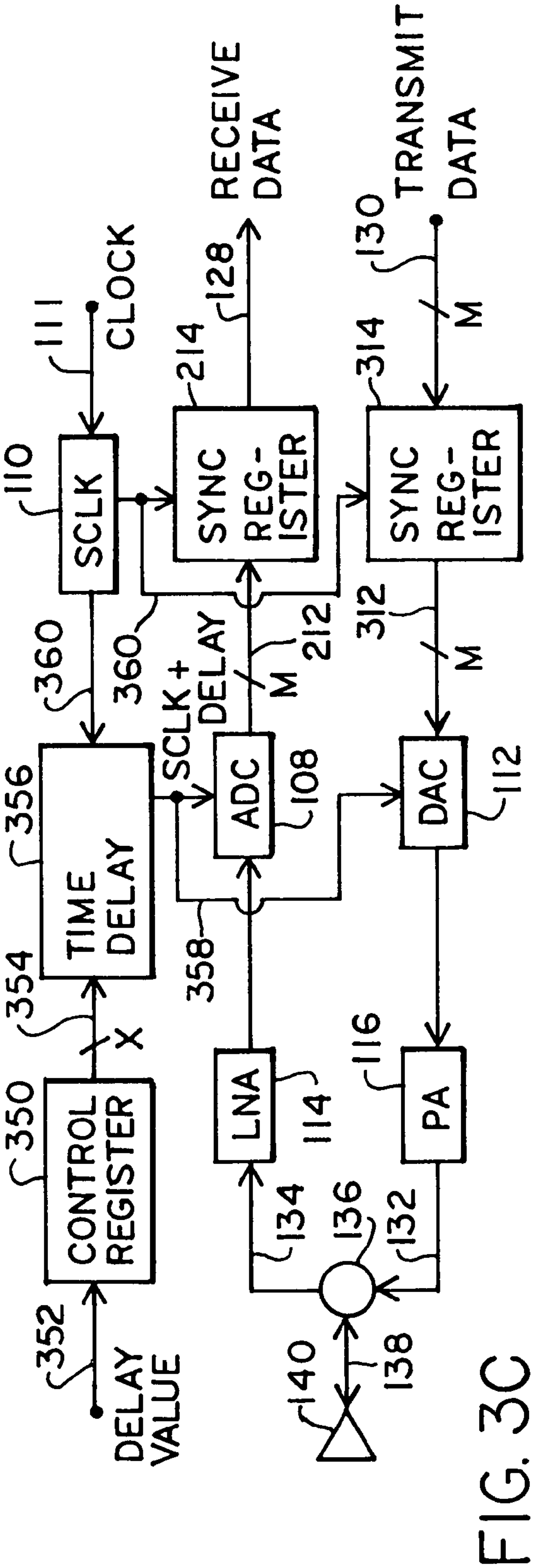
FIG. 3C is a block diagram of an alternative embodiment for the transmit and receive path of a digital phased array module having time delay control of the sampling rate for an analog-to-digital converter (ADC), according to the present invention.

For example, FIG. 3C is a block diagram of an alternative embodiment for the transmit and receive path circuitry of a digital phased array module having time delay control of ADC and DAC sampling rates according to the present invention. In this embodiment, a single control register 350 and common time delay circuitry 356 are utilized for both the ADC 108 and the DAC 112. The delay value 352, therefore, controls the clock signal 358 (SCLK+DELAY) that is sent to both the ADC 108 and the DAC 112. This clock signal 358 (SCLK+DELAY) includes the clock signal (SCLK) 360 provided by clock circuitry 110 plus a programmable time delay added by time delay circuitry 356. The clock signal 360 (SCLK) is also provided to registers 214 and 314 that are utilized to synchronize the transmit and receive signals. In this architecture, therefore, the same time delay is applied to the receive path ADC and the transmit path DAC such that the receive and transmit beams would have the same shape and main lobe orientation.

Figure 4:
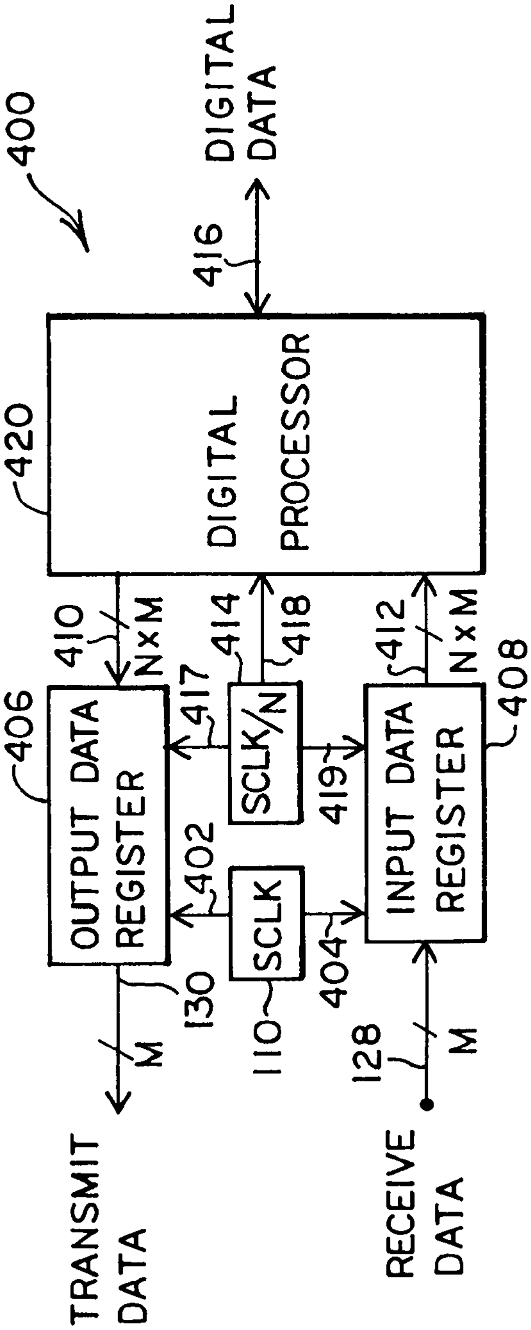
FIG. 4 is a block diagram of data conversion circuitry that may be utilized with the digital phased array modules, according to the present invention.

Looking now to FIG. 4, a block diagram is depicted for data conversion circuitry 400 that may be utilized with digital phased array modules 200A/200B. This data conversion circuitry 400 provides one embodiment of circuitry that may be used to reduce the transmission rate of data coming from the antenna elements. The input data register 408 receives the M-bit receive data signal 128 at an input clock rate that is timed by the SCLK clock signal 404 from the clock circuitry (SCLK) 110. The input data register 408 may store multiple (N) words of data coming from the antenna element. The output signal from the input data register 408 may then be an N×M-bit signal that is output at a clock rate that is timed by the SCLK/N clock signal 419 from the clock circuitry (SCLK/N) 414. A digital processor 420 may also be included to process the digital information as desired before passing it on through a digital data input/output interface signal 416. The digital processor 420 may also receive an SCLK/N clock signal 418 from the clock circuitry (SCLK/N) 414. This data rate conversion from SCLK to SCLK/N allows the downstream digital processing circuitry to operate at a lower clock speed.

The transmit path is similar to this receive path. Digital data may be provided from a digital processor, if desired, through input/output interface 416. The input signal 410 to the output data register 406 may be an N×M-bit signal. The output data register 406 may receive this N×M-bit signal 410 at a clock rate that is timed by the SCLK/N clock signal 417 from the clock circuitry 414. The transmit data signal 130 from the output data register 406 may be an M-bit signal. The M-bit transmit data signal 130 may be output at a clock rate that is timed by the SCLK clock signal 402 from the clock circuitry (SCLK) 110. This data conversion from SCLK/N to SCLK allows the upstream digital processing circuitry to operate at a lower clock speed.

Figure 5:
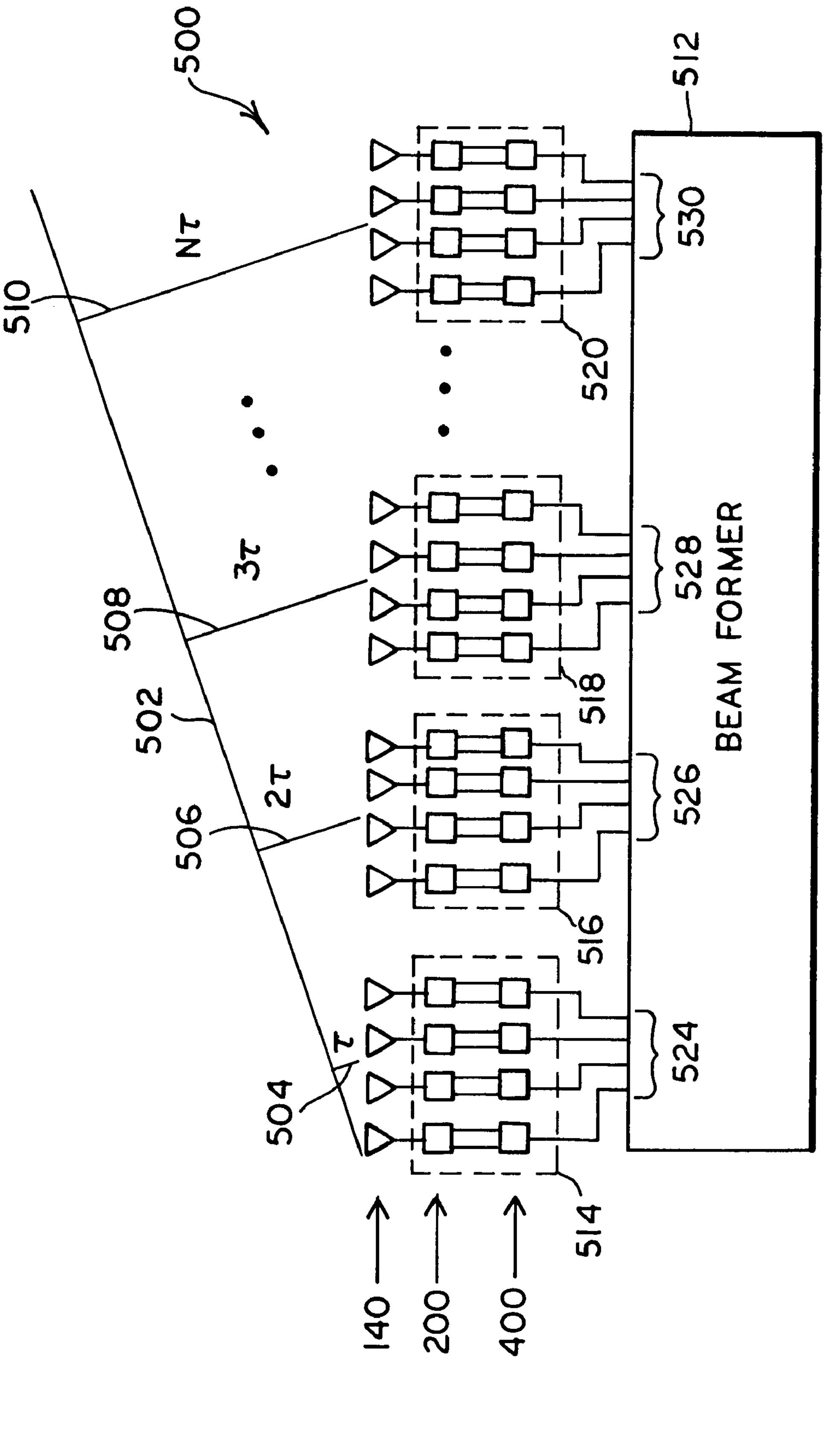
FIG. 5 is a block diagram of a phased array utilizing digital phased array modules, according to the present invention.

FIG. 5 is a block diagram of phased array 500 utilizing digital phased array modules 200, which in this embodiment are the combination of receive and transmit modules 200A and 200B. As depicted, the antenna elements 140 are separated into groups of four antenna elements. Each digital phased array module 200 is coupled to respective data conversion circuitry 400. A beam former 512 receives information from all of the antenna elements and processes the data as desired to reconstruct the incoming information or to prepare the outgoing information. It is noted that the number of antenna elements, how those antenna elements are grouped, and the processing circuitry utilized may be selected as desired depending upon the resulting system desired.

Line 502 represents an incoming or outgoing wave front for electromagnetic energy being received or transmitted by the phased array 500. The lines 504, 506, 508 . . . 510 represent time delays associated with the arrival or departure of the wave-front 502 with respect to the antenna elements 140. In particular, line 504 represents a base delay amount ($\tau$) between the wave front 500 and a first group of four antenna elements associated with module and processing circuitry 514. Line 506 represents a 2× delay amount ($2\tau$) between the wave front 500 and a second group of four antenna elements associated with module and processing circuitry 516. Line 508 represents a 3× delay amount ($3\tau$) between the wave front 500 and a third group of four antenna elements associated with module and processing circuitry 518. Line 510 represents a NX delay amount ($N\tau$) between the wave front 500 and an Nth group of four antenna elements associated with module and processing circuitry 520.

Referring back to FIGS. 2 and 3, the delay amounts associated with lines 502, 504, 506 . . . 510 correspond to the amount of delay that would be programmed and added by time delay circuitry 208 in the receive path and time delay circuitry 308 in the transmit path. In the phased array embodiment 500 shown in FIG. 5, each of the digital phased array modules 200 within the first group 514 would be programmed with the same delay amount. Each of the digital phased array modules 200 within second group 516 would be programmed with the same delay amount, and so on. Each group 514, 516, 518 . . . 520 would provide respective data groups 524, 526, 528 . . . 530 to beam former 512. This may be done, for example, so that the data coming from each group may be summed to form a combined digital value for that group of antenna elements. It is again noted that the number and groupings of antenna elements, and how the data is ultimately processed and combined, may be modified as desired while still utilizing the digital phased array modules according to the present invention.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as presently preferred embodiments. Equivalent elements or materials may be substituted for those illustrated and described herein, and certain features of the invention may be utilized independently of the use of other features, all as would be apparent to one skilled in the art after having the benefit of this description of the invention.

I claim:

1. A digital phased array receiver for receiving electromagnetic energy, comprising:

a plurality of antenna elements capable of receiving electromagnetic energy;

a receive module coupled to each of the plurality of antenna elements, the receive module including an analog to digital converter controlled by a sampling clock signal generated by clock circuitry coupled to a delay circuit; and synchronization circuitry coupled to the analog to digital converter to receive and then output data from the analog to digital converter at an output clock rate;

wherein each delay circuit delays a base clock signal from the clock circuitry by a desired amount so that a receive direction of the plurality of antenna elements can be electronically controlled; and wherein the output clock rate for the synchronization circuitry matches the clock signal controlling the analog to digital converter.

2. The digital phased array receiver of claim 1, wherein each analog to digital converter has a multiple bit digital value as an output.

3. The digital phased array receiver of claim 1, wherein each analog to digital converter is a single bit digital value as an output.

4. The digital phased array receiver of claim 1, further comprising multiple data conversion circuits coupled to receive the output of each analog to digital converter at a first clock rate and having an output signal at a second clock rate.

5. The digital phased array receiver of claim 4, wherein the first clock rate matches the base clock signal and the second clock rate is slower than the first clock rate.

6. The digital phased array receiver of claim 1, wherein an amount of delay provided by each delay circuit is programmable.

7. The digital phased array receiver of claim 6, wherein the plurality of antenna elements are grouped into sets of antenna elements and wherein each antenna element within the same set has the same amount of programmed delay.

8. The digital phased array receiver of claim 1, wherein the electromagnetic energy is radio-frequency energy.

9. A digital phased array receive-path module, comprising:

an analog to digital converter having an analog input signal representative of received electromagnetic energy;

clock circuitry having a clock output signal;

time delay circuitry coupled to the clock output signal to provide a relative delay to the clock output signal, the delayed clock output signal being coupled to the analog to digital converter to control a sampling rate for the analog to digital converter; and synchronization circuitry coupled to the analog to digital converter to receive and then output data from the analog to digital converter at an output clock rate;

wherein the output clock rate for the synchronization circuitry matches the clock signal controlling the analog to digital converter.

10. The digital phased array receive-path module of claim 9, wherein the analog to digital converter has a multiple bit digital value as an output.

11. The digital phased array receive-path module of claim 9, wherein the analog to digital converter is a single bit digital value as an output.

12. The digital phased array receive-path module of claim 9, wherein an amount of delay provided by the delay circuit is programmable.

13. The digital phased array receive-path module of claim 12, wherein the delay circuit is controlled by a digital word provided by a control register that may be loaded with a desired delay value.

14. The digital phased array receive-path module of claim 9, wherein the electromagnetic energy is radio-frequency energy.

15. A digital phased array transmitter for transmitting electromagnetic energy, comprising:

a plurality of antenna elements capable of transmitting electromagnetic energy;

a transmit module coupled to each of the plurality of antenna elements, the transmit module including a digital to analog converter having an operational rate controlled by a clock signal generated by clock circuitry coupled to a delay circuit; and synchronization circuitry coupled to the digital to analog converter to receive and then output data to the digital to analog converter at an output clock rate;

wherein each delay circuit delays a base clock signal from the clock circuitry by a desired amount so that a transmit direction of the plurality of antenna elements can be electronically controlled; and wherein the output clock rate for the synchronization circuitry matches the clock signal controlling the digital to analog converter.

16. The digital phased array transmitter of claim 15, wherein each digital to analog converter has a multiple bit digital value as an input.

17. The digital phased array transmitter of claim 15, wherein each digital to analog converter is a single bit digital value as an input.

18. The digital phased array transmitter of claim 15, further comprising multiple data conversion circuits coupled to provide an output signal to each analog to digital converter at a first clock rate and having an input signal at a second clock rate.

19. The digital phased array transmitter of claim 18, wherein the first clock rate matches the base clock signal and the second clock rate is slower than the first clock rate.

20. The digital phased array transmitter of claim 15, wherein an amount of delay provided by each delay circuit is programmable.

21. The digital phased array transmitter of claim 20, wherein the plurality of antenna elements are grouped into sets of antenna elements and wherein each antenna element within the same set has the same amount of programmed delay.

22. The digital phased array transmitter of claim 15, wherein the electromagnetic energy is radio-frequency energy.

23. A digital phased array transmit-path module, comprising:

a digital to analog converter having a digital input signal representative of electromagnetic energy to be transmitted;

clock circuitry having a clock output signal;

programmable time delay circuitry coupled to the clock output signal to provide a relative delay to the clock output signal, the delayed clock output signal being coupled to the digital to analog converter to control a operational rate for the digital to analog converter; and synchronization circuitry coupled to the digital to analog converter to receive and then output data to the digital to analog converter at an output clock rate;

wherein the output clock rate for the synchronization circuitry matches the clock signal controlling the digital to analog converter.

24. The digital phased array transmit-path module of claim 23, wherein the digital to analog converter has a multiple bit digital value as an output.

25. The digital phased array transmit-path module of claim 23, wherein the digital to analog converter is a single bit digital value as an output.

26. The digital phased array transmit-path module of claim 23, wherein an amount of delay provided by the delay circuit is programmable.

27. The digital phased array transmit-path module of claim 26, wherein the delay circuit is controlled by a digital word provided by a control register that may be loaded with a desired delay value.

28. The digital phased array transmit-path module of claim 23, wherein the electromagnetic energy is radio-frequency energy.

29. A digital phased array transceiver for receiving and transmitting electromagnetic energy, comprising:

a plurality of antenna elements capable of receiving and transmitting electromagnetic energy;

a receive module coupled to each of the plurality of antenna elements, each receive module including an analog to digital converter controlled by a sampling clock signal generated by clock circuitry coupled to a programmable delay circuit, wherein each programmable delay circuit delays a base clock signal from the clock circuitry by a desired amount so that a receive direction of the plurality of antenna elements can be electronically controlled;

synchronization circuitry coupled to the analog to digital converter to receive and then output data from the analog to digital converter at an output clock rate, wherein the output clock rate for the synchronization circuitry matches the clock signal controlling the analog to digital converter;

a transmit module coupled to each of the plurality of antenna elements, each transmit module including a digital to analog converter having an operational rate controlled by a clock signal generated by clock circuitry coupled to a programmable delay circuit, wherein each programmable delay circuit delays a base clock signal from the clock circuitry by a desired amount so that a transmit direction of the plurality of antenna elements can be electronically controlled; and synchronization circuitry coupled to the digital to analog converter to receive and then output data to the digital to analog converter at an output clock rate, wherein the output clock rate for the synchronization circuitry matches the clock signal controlling the digital to analog converter.

30. The digital phased array transceiver of claim 29, wherein the electromagnetic energy is radio frequency energy.

31. A digital phased array transmit/receive module, comprising:

an analog to digital converter having an analog input signal representative of received electromagnetic energy;

a digital to analog converter having a digital input signal representative of electromagnetic energy to be transmitted;

clock circuitry having a clock output signal;

programmable time delay circuitry coupled to the clock output signal to provide a relative delay to the clock output signal, the delayed clock output signal being coupled to the analog to digital converter to control a sampling rate for the analog to digital converter and being coupled to the digital to analog converter to control a operational rate for the digital to analog converter;

synchronization circuitry coupled to the analog to digital converter to receive and then output data from the analog to digital converter at an output clock rate, wherein the output clock rate for the synchronization circuitry matches the clock signal controlling the analog to digital converter; and synchronization circuitry coupled to the digital to analog converter to receive and then output data to the digital to analog converter at an output clock rate, wherein the output clock rate for the synchronization circuitry matches the clock signal controlling the digital to analog converter.

32. The digital phased array of claim 31, wherein the electromagnetic energy is radio frequency energy.

33. The digital phased array of claim 31, wherein the programmable delay circuitry comprises a first time delay circuit having a clock output for the analog to digital converter and a second time delay circuit having a clock output for the digital to analog converter.

34. The digital phased array of claim 31, wherein the programmable delay circuitry comprises a single time delay circuit having a single clock output for both the analog to digital converter and the digital to analog converter.

35. The digital phased array of claim 31, wherein the programmable delay circuitry comprises digitally programmable micro-electromechanical switch (MEMS) phase shifters.

36. The digital phased array of claim 31, wherein the programmable delay circuitry comprises digitally programmable diode phase shifters.

37. The digital phased array of claim 31, wherein the programmable delay circuitry comprises digitally programmable field effect transistor (FET) switching devices.

38. A method for receiving electromagnetic energy, comprising:

receiving analog electromagnetic energy with a plurality of antenna elements;

converting analog information from the plurality of antenna elements to digital information utilizing an analog to digital converters associated with the antenna elements;

controlling each analog to digital converter with a sampling clock signal generated by clock circuitry coupled to a delay circuit so that each delay circuit delays a base clock signal from the clock circuitry by a desired amount so that a receive direction of the plurality of antenna elements can be electronically controlled; and utilizing synchronization circuitry to receive output data from the analog to digital converter and to synchronize the output data to an output clock rate, wherein the output clock rate matches the clock signal controlling the analog to digital converter.

39. The method of claim 38, wherein each analog to digital converter has a multiple bit digital value as an output.

40. The method of claim 38, wherein each analog to digital converter has a single bit digital value as an output.

41. The method of claim 38, wherein an amount of delay provided by each delay circuit is programmable.

42. The method of claim 41, further comprising grouping the plurality of antenna elements into sets of antenna elements and setting the same amount of programmed delay for each antenna element within the same set.

43. The method of claim 38, wherein the electromagnetic energy is radio-frequency energy.

44. A method for processing received electromagnetic energy, comprising:

converting analog information representative of received electromagnetic energy to digital information utilizing an analog to digital converter;

generating a clock signal that includes a delay;

controlling a sampling rate for the analog to digital converter with the clock signal; and utilizing synchronization circuitry to receive output data from the analog to digital converter and to synchronize the output data to an output clock rate, wherein the output clock rate matches the clock signal controlling the analog to digital converter.

45. The method of claim 44, wherein the analog to digital converter has a multiple bit digital value as an output.

46. The method of claim 44, wherein the analog to digital converter has a single bit digital value as an output.

47. The method of claim 44, further comprising programming the amount of delay included in the clock signal.

48. The method of claim 44, wherein the electromagnetic energy is radio-frequency energy.

49. A method for transmitting electromagnetic energy, comprising:

converting digital information to analog information utilizing a plurality of digital to analog converters associated with a plurality of antenna elements;

controlling an operational rate for each digital to analog converter with a clock signal generated by clock circuitry coupled to a delay circuit so that each delay circuit delays a base clock signal from the clock circuitry by a desired amount so that a transmit direction of the plurality of antenna elements can be electronically controlled;

transmitting electromagnetic energy in the transmit direction; and utilizing synchronization circuitry to receive data, to synchronize the data to a clock rate, and to output the synchronized data to a digital to analog converter, wherein the clock rate matches the clock signal controlling the digital to analog converter.

50. The method of claim 49, wherein each digital to analog converter has a multiple bit digital value as an input.

51. The method of claim 49, wherein each digital to analog converter has a single bit digital value as an input.

52. The method of claim 49, wherein an amount of delay provided by each delay circuit is programmable.

53. The method of claim 52, further comprising grouping the plurality of antenna elements into sets of antenna elements and setting the same amount of programmed delay for each antenna element within the same set.

54. The method of claim 49, wherein the electromagnetic energy is radio-frequency energy.

55. A method for processing electromagnetic energy for transmission, comprising:

converting digital information representative of electromagnetic energy for transmission to analog information utilizing a digital to analog converter;

generating a clock signal that includes a delay;

controlling an operational rate for the digital to analog converter with the clock signal; and utilizing synchronization circuitry to receive data, to synchronize the data to a clock rate, and to output the synchronized data to a digital to analog converter, wherein the clock rate matches the clock signal controlling the digital to analog converter.

56. The method of claim 55, wherein the digital to analog converter has a multiple bit digital value as an input.

57. The method of claim 55, wherein the digital to analog converter has a single bit digital value as an input.

58. The method of claim 55, further comprising programming the amount of delay included in the clock signal.

59. The method of claim 55, wherein the electromagnetic energy is radio-frequency energy.

* * * * *